(12) United States Patent
Kupcsik et al.

(10) Patent No.: US 12,515,335 B2
(45) Date of Patent: Jan. 6, 2026

(54) DEVICE AND METHOD FOR CONTROLLING A ROBOT

(71) Applicant: Robert Bosch GmbH, Stuttgart (DE)

(72) Inventors: Andras Gabor Kupcsik, Herrenberg (DE); Leonel Rozo, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 182 days.

(21) Appl. No.: 18/488,143

(22) Filed: Oct. 17, 2023

(65) Prior Publication Data

US 2024/0208056 A1 Jun. 27, 2024

(30) Foreign Application Priority Data

Nov. 25, 2022 (DE) ...................... 10 2022 212 638.6

(51) Int. Cl.
*B25J 9/16* (2006.01)

(52) U.S. Cl.
CPC ........... *B25J 9/1664* (2013.01); *B25J 9/1653* (2013.01)

(58) Field of Classification Search
CPC ...... B25J 9/1664; B25J 9/1653; B25J 9/1628; B25J 9/16; B25J 9/1694; B25J 9/1697; G05B 13/02; G06F 17/17
See application file for complete search history.

(56) References Cited

U.S. PATENT DOCUMENTS

2021/0178585 A1* 6/2021 Rozo ...................... G06N 3/006

FOREIGN PATENT DOCUMENTS

| DE | 102020214231 A1 | 5/2022 |
| DE | 102021204961 A1 | 11/2022 |
| EP | 3812972 A1 | 4/2021 |

* cited by examiner

*Primary Examiner* — Dylan M Katz
(74) *Attorney, Agent, or Firm* — NORTON ROSE FULBRIGHT US LLP

(57) ABSTRACT

A method for controlling a technical system. The method includes determining an initial control sequence comprising control information for each control time of a sequence of control times, determining value approximation parameters for approximating the value of a state of the technical system and determining, for each control time, an updated control sequence comprising updated control information for each control time by determining the updated values such that the values of the states of the state sequence which the technical system follows when being controlled according to the updated control sequence are maximized according to the value approximation parameters and controlling the technical system according to the updated control sequence.

8 Claims, 3 Drawing Sheets

DEVICE AND METHOD FOR CONTROLLING A ROBOT

CROSS REFERENCE

The present application claims the benefit under 35 U.S.C. § 119 of German Patent Application No. DE 10 2022 212 638.6 filed on Nov. 25, 2022, which is expressly incorporated herein by reference in its entirety.

FIELD

The present invention relates to devices and methods for controlling a robot.

BACKGROUND INFORMATION

Optimal control and more specifically dynamic programming in discrete time is a key concept for controlling multi-DoF (degree of freedom) robots to achieve complex tasks. An optimal control problem is defined via a cost function, which encodes the goal of the task, and constraints that ensure dynamics consistency and control limitations along the optimal state-control trajectory. However, most approaches for designing feasible trajectories for robots with nonlinear dynamics consider the system state to be Euclidean and adapting them to the Riemannian setting is non-trivial. An important challenge when the state (or configuration) space is a Riemannian manifold is the lack of a global vector space, thus recursively solving a dynamic program is not well defined.

Therefore, efficient approaches for controlling a robot device whose space of configurations is given by a Riemannian manifold (such as a sphere) are desirable.

SUMMARY

According to various embodiments of the present invention, a method for controlling a technical system is provided comprising:
  Determining an initial control sequence comprising control information for each control time of a sequence of control times;
  Determining an initial state sequence which the technical system follows when being controlled according to the initial control sequence, wherein the initial state sequence comprises states wherein each state is given by an element of a predetermined Riemannian manifold;
  Determining, for each state of the initial state sequence,
    state approximation parameters for approximating the dependency of a change of state of the technical system from the control information in the tangent space of the Riemannian manifold at the state;
    cost approximation parameters for approximating the dependency of a change of control cost of the state from the control information in the tangent space of the Riemannian manifold at the state;
    value approximation parameters for approximating the dependency of a change of value of the state from the control information in the tangent space of the Riemannian manifold at the state by following the initial state sequence backwards and updating the value approximation parameters from state to state according to the state approximation parameters and the cost approximation parameters;
  Determining, for each control time, an updated control sequence comprising updated control information for each control time by following the sequence of control times forwards and determining the updated values by determining them to maximize such that the values of the states of the state sequence which the technical system follows when being controlled according to the updated control sequence are maximized according to the value approximation parameters; and
  controlling the technical system according to the updated control sequence.

The above method provides an efficient way to determine control information (i.e. control inputs like control signals for actuators etc.) when the technical system comprises states which are represented by elements of a Riemannian manifold.

Various examples of the present invention are described in the following.

Example 1 is a method for controlling a technical system as described above.

Example 2 is the method of example 1, comprising separating the sequence of control times into a plurality of segments and treating the starting state of each segment as a decision variable when determining the updated control sequence.

In other words, Gauss-Newton Multiple Shooting is applied in a Riemannian iLQC. This increases stability when there are many control time steps.

Example 3 is the method of example 1 or 2, wherein the state approximation parameters linearly approximate the dependency of a change of state of the technical system from the control information in the tangent space of the Riemannian manifold at the state.

This allows considering the impact of the control information on the state with sufficient accuracy while keeping the computational burden sufficiently low to allow efficient control.

Example 4 is the method of any one of examples 1 to 3, wherein the cost approximation parameters quadratically approximate the dependency of a change of control cost of the state from the control information in the tangent space of the Riemannian manifold at the state.

This allows considering the impact of the control information on the control cost with sufficient accuracy while keeping the computational burden sufficiently low to allow efficient control.

Example 5 is the method of any one of examples 1 to 4, wherein the value approximation parameters quadratically approximate the dependency of a change of value of the state from the control information in the tangent space of the Riemannian manifold at the state.

This allows considering the impact of the control information on the value with sufficient accuracy while keeping the computational burden sufficiently low to allow efficient control.

Example 6 is the method of any one of examples 1 to 5, comprising performing multiple iterations comprising, in each iteration from a first to a last iteration,
  Determining a respective initial control sequence comprising control information for each control time of the sequence of control times;
  Determining a respective initial state sequence which the technical system follows when being controlled according to the initial control sequence, wherein the initial state sequence comprises states wherein each state is given by an element of the predetermined Riemannian manifold;

Determining, for each state of the respective initial state sequence, state approximation parameters for approximating the dependency of a change of state of the technical system from the control information in the tangent space of the Riemannian manifold at the state;

cost approximation parameters for approximating the dependency of a change of control cost of the state from the control information in the tangent space of the Riemannian manifold at the state;

value approximation parameters for approximating the dependency of a change of value of the state from the control information in the tangent space of the Riemannian manifold at the state by following the initial state sequence backwards and updating the value approximation parameters from state to state according to the state approximation parameters and the cost approximation parameters;

Determining, for each control time, an updated control sequence comprising updated control information for each control time by following the sequence of control times forwards and determining the updated values such that the values of the states of the state sequence which the technical system follows when being controlled according to the updated control sequence are maximized according to the value approximation parameters;

wherein, for each iteration but the last iteration, the updated control sequence of the iteration is the initial control sequence for the next iteration and wherein the method comprises controlling the technical system according to the updated control sequence.

So, multiple iterations of the update process of example 1 may be performed which increases the performance of the control.

Example 7 is a controller configured to perform a method of any one of the above examples.

Example 8 is a computer program comprising instructions which, when executed by a computer, makes the computer perform a method according to any one of the above examples.

Example 9 is a computer-readable medium comprising instructions which, when executed by a computer, makes the computer perform a method according to any one of the above examples.

In the figures, similar reference characters generally refer to the same parts throughout the different views. The figures are not necessarily to scale, emphasis instead generally being placed upon illustrating the principles of the present invention. In the following description, various aspects are described with reference to the figures.

DETAILED DESCRIPTION OF EXAMPLE EMBODIMENTS

The following detailed description refers to the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
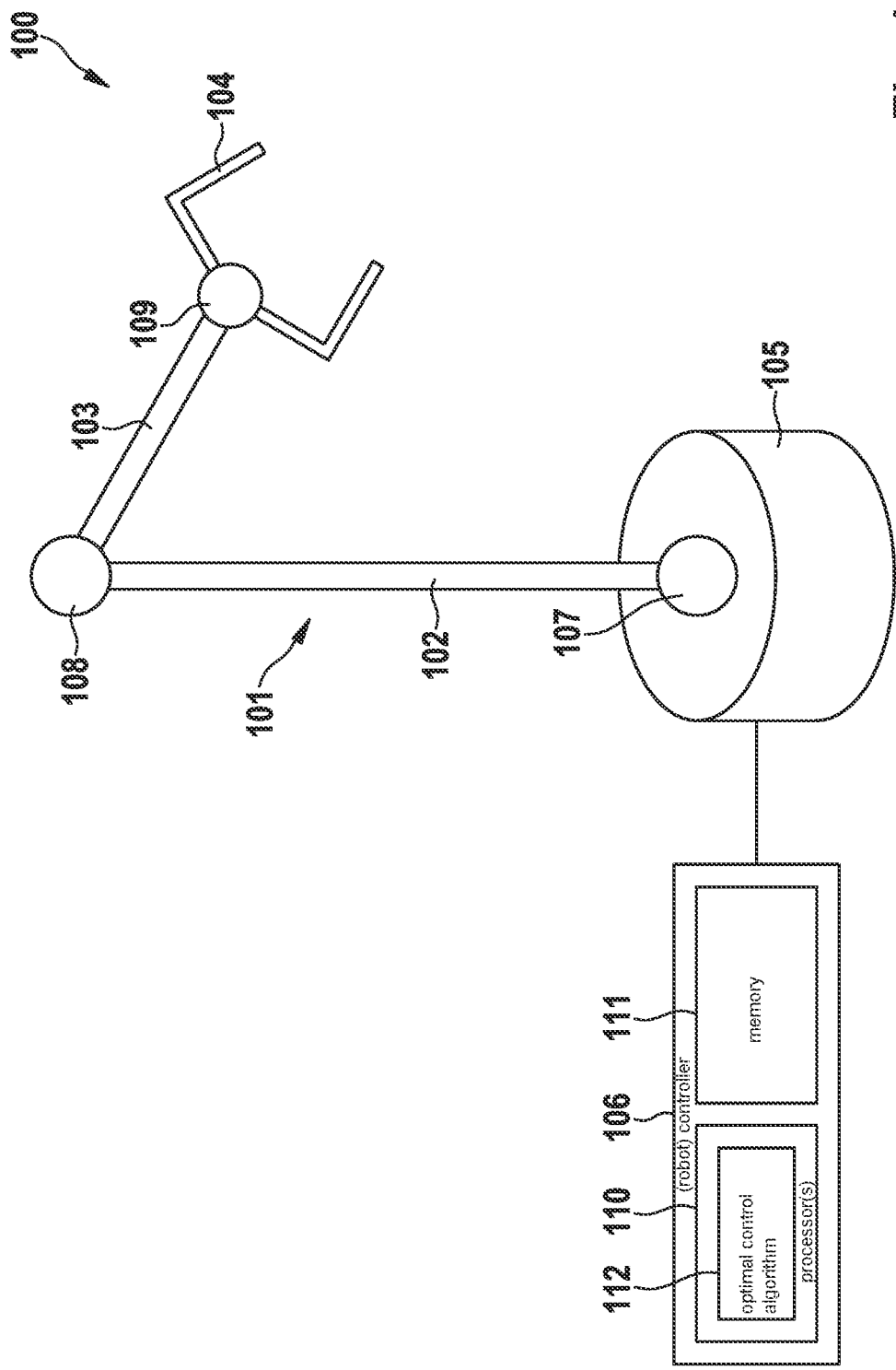
FIG. 1 shows a robot, according to an example embodiment of the present invention.

FIG. 1 shows a robot 100.

The robot 100 includes a robot arm 101, for example an industrial robot arm for handling or assembling a work piece (or one or more other objects). The robot arm 101 includes manipulators 102, 103, 104 and a base (or support) 105 by which the manipulators 102, 103, 104 are supported. The term "manipulator" refers to the movable members of the robot arm 101, the actuation of which enables physical interaction with the environment, e.g. to carry out a task. For control, the robot 100 includes a (robot) controller 106 configured to implement the interaction with the environment according to a control program. The last member 104 (furthest from the support 105) of the manipulators 102, 103, 104 is also referred to as the end-effector 104 and may include one or more tools such as a welding torch, gripping instrument, painting equipment, or the like.

The other manipulators 102, 103 (closer to the support 105) may form a positioning device such that, together with the end-effector 104, the robot arm 101 with the end-effector 104 at its end is provided. The robot arm 101 is a mechanical arm that can provide similar functions as a human arm (possibly with a tool at its end).

The robot arm 101 may include joint elements 107, 108, 109 interconnecting the manipulators 102, 103, 104 with each other and with the support 105. A joint element 107, 108, 109 may have one or more joints, each of which may provide rotatable motion (i.e. rotational motion) and/or translatory motion (i.e. displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g. an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g. to an actuator in the present example. The controller may be configured, for example, by program code (e.g., software) to control the operation of a system, a robot in the present example.

In the present example, the controller 106 includes one or more processors 110 and a memory 111 storing code and data based on which the processor 110 controls the robot arm 101. According to various embodiments, the controller 106 controls the robot arm 101 on the basis of a optimal control algorithm 112.

In the present example, the system (i.e. here robot) state $r=[x,\dot{x}, \ldots ]$ is the position on the Riemannian manifold $x \in \mathcal{M}$ and higher order derivates, such as velocities $\dot{x}$ defined in the tangent space of the manifold at x, $\mathcal{T}_x$. In the present example, a second order system state $r=[x,\dot{x}]$ is considered. These vectors are considered to be given in embedding space, or ambient coordinates. For example, in case of an $S^1$ manifold, the ambient space is $\mathbb{R}^2$, that is, the second order state is a 4-vector.

In most cases it is easier to evaluate computations directly in the tangent space of the manifold at a given position. The tangent vectors are defined directly in the Euclidean submanifold expanded by the local basis of the tangent space $\mathcal{T}_x$. In order to work with tangent vectors in different tangent spaces a consistent, global definition of the local basis is needed. Therefore, according to various embodiments, the manifold is endowed with an origin, $o \in \mathcal{M}$ and a fixed basis, $B_o=[b_o^0, \ldots, b_o^N]$, $|B_o|=1$ defined in $\mathcal{T}_o$, with N as the embedding, or ambient space dimension (N=2 for $S^1$).

Figure 2:
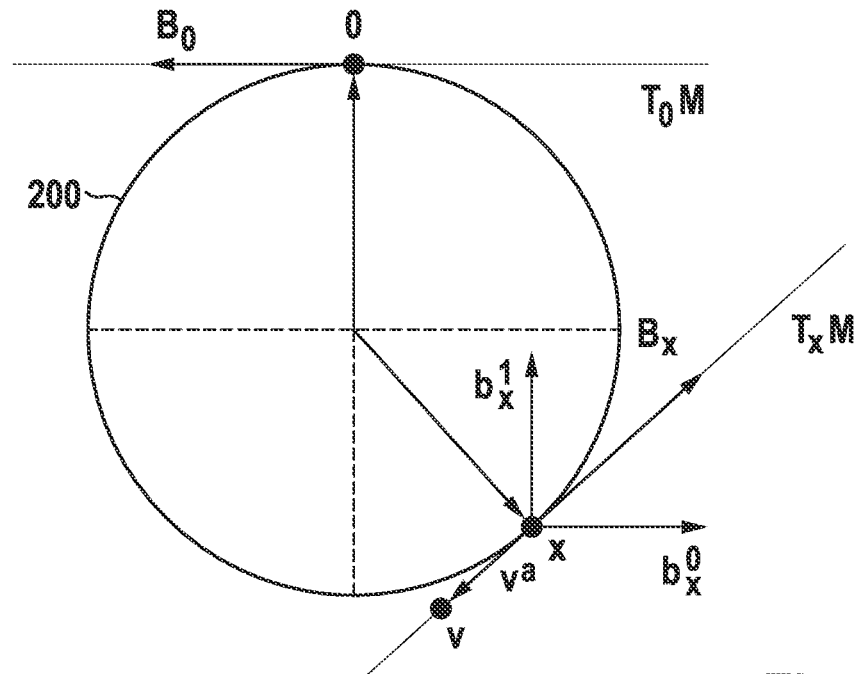
FIG. 2 shows the $S^1$ manifold as an illustrative example for a robot state space given by a Riemannian manifold, according to an example embodiment of the present invention.

FIG. 2 shows the $S^1$ manifold 200 as an illustrative example for a robot state space given by an Riemannian manifold.

For the $S^1$ manifold the origin may be defined in ambient coordinates at $o=[0,1]^T$ and the basis vector as $B_o=[b_o^0, b_o^1]=[-1,0]$. Then, any tangent vector $v \in \mathbb{R}^1$ can be expressed in ambient space at x as $v^a = B_x v \in \mathcal{T}_x$. Similarly, the tangent vector can be recovered from the ambient tangent space vector as $v=B_x^{-1} v^a$. The basis at x can be computed via the parallel transport operation $$B_x=[b_x^0, \ldots, b_x^N] = [\Gamma_{o \to x}(b_o^0), \ldots, \Gamma_{o \to x}(b_o^N)]. \quad (1)$$

In the example of FIGS. 2, v=−1 and the corresponding ambient space vector is $v^a=[-b_x^0, -b_x^1]$.

To rollout a trajectory given the initial state $r_0$ and the control sequence $U_0=[u_0, \ldots, u_{T-1}]$, the equation $r_{t+1}=f_\mathcal{M}(r_t, u_t)$ needs to be repeatedly solved (for all t up to the final time T). To keep the problem tractable tangent space computations in $\mathcal{T}_{x_t}$ at time step t are used. To this end, the tangent space position $v_t \in \mathcal{T}_{x_t}$ is introduced and it is assumed that $\dot{x}_t \in \mathcal{T}_{x_t}$. The tangent space dynamics equation is given by $$[v_{t+1}, \dot{x}_{t+1}]=f(v_t, \dot{x}_t, u_t) \in \mathcal{T}_{x_t} \mathcal{M} \quad (2)$$

It should be noted that the tangent space dynamics model $f(\cdot)$ is defined in the vector space of $\mathcal{T}_{x_t}$, as opposed to the manifold dynamics model $f_\mathcal{M}(\cdot)$, which directly maps to manifold state. In practice, it is easier to define and rollout the dynamics in tangent space and impose manifold operations as an additional step, therefore, according to various embodiments, the tangent space dynamics are used.

After solving Eq. (2) the subsequent state $r_t=[x_{t+1}, \dot{x}_{t+1}]$ is computed by $$x_{t+1}=Exp_{x_t}(v_t+1),$$

$$\dot{x}_{t+1}=\Gamma_{x_t \to x_{t+1}}(\dot{x}_t+1) \in \mathcal{T}_{x_{t+1}} \mathcal{M} \quad (3)$$

with $\Gamma_{x_t \to x_{t+1}}(\cdot)$ as the parallel transport operation between the tangent spaces of $x_t$ and $x_{t+1}$. The parallel transport operation is necessary to propagate tangent space vectors, such as velocities $\dot{x}$, consistently between consecutive states.

Figure 3:
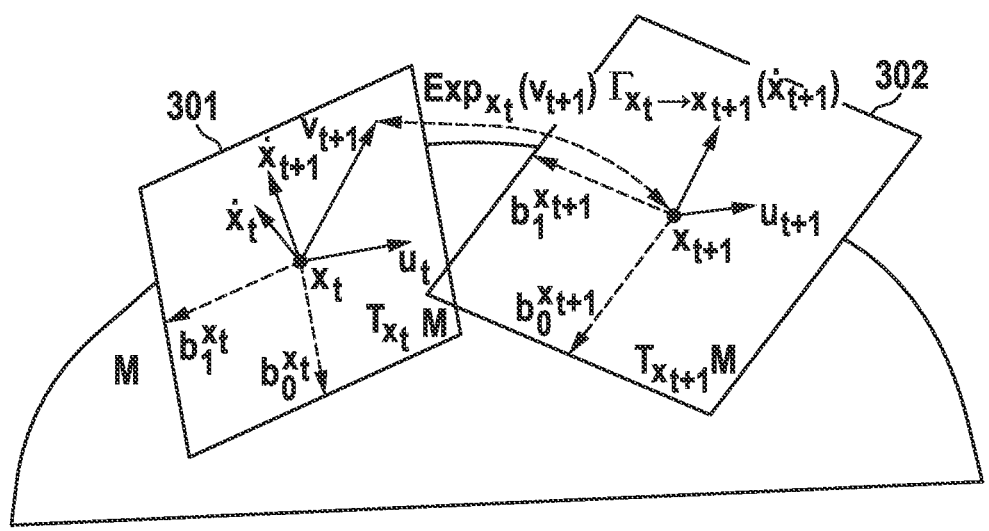
FIG. 3 illustrates a dynamic rollout including parallel transport between two tangent spaces, according to an example embodiment of the present invention.

FIG. 3 illustrates a parallel transport between the tangent space 301 at $x_t$ and the tangent space tangent space 302 at $x_{t+1}$.

The parallel transport is part of the dynamic rollout (in particular here the transition from time t to time t+1 in the rollout).

The problem of controlling the robot 100, which is in this example a Riemannian optimal control problem, is defined as finding the control sequence $U_0=[u_0, \ldots, u_{T-1}]$ with initial state $r_0=[x_0, \dot{x}_0]$ that minimizes the cost function $$J_0 = \sum_{t=0}^{T-1} l_t(r_t, u_t) + l_T(r_T), \text{ s.t. } r_{t+1} = f_\mathcal{M}(r_t, u_t), \quad (4)$$

with $l_t$ as the cost function at time t and with $l_T$ as the final cost (i.e. the cost at the final time T). The value of state $x_t$ at time t is defined as the optimal cost to go $$V_t(x_t) = \min_{U_t}[J_t]. \quad (5)$$

wherein $J_t$ is the measure of the total cost from time step t (similar to equation (4) where t=0).

The cost may for example be energy cost and reflect how well a goal is achieved (e.g. how well a target location is reached by the robot).

Due to the Principle of Optimality the optimal control problem can be reformulated using the Bellmann equation $$V_t(\mathfrak{x}) = \min_u [l_t(\mathfrak{x}, u) + V_{t+1}(f_\mathcal{M}(\mathfrak{x}, u))]. \quad (6)$$

Solving the Bellmann equation in u yields the optimal control sequence $U=[u_0, \ldots, u_{T-1}]$. However, for most real-world problems with nonlinear dynamics models and cost functions the optimal control problem does not have a closed form solution.

According to various embodiments a Differential Dynamic Programming approach is used. This includes approximating the nonlinear dynamics and cost with a local linear-quadratic function, in which case the value becomes locally quadratic. Then, the local linear-quadratic sub-problems are solved iteratively until convergence to an optimal solution. This approach is tractable given the twice-differentiable cost and dynamics.

Further, this iterative approach is compatible with the Riemannian setting. In essence, the recursive computations of dynamic programs are evaluated in the tangent plane of the current state $\mathcal{T}_{x_t}$ and parallel transportation is employed when necessary. A local linear dynamics equation is used such that $[v,\dot{x}]_{t+1}=A_{x_t}[v,\dot{x}]_t+B_{x_t}u_t$ and a quadratic approximation of the cost and value is used. While vector transportation between tangent spaces incurs additional computational cost, it makes adoption of differential dynamic programming algorithms to the Riemannian setting possible. In the following, an iterative linear quadratic control approach for the Riemannian setting (i.e. a Riemannian state space) according to an embodiment is described.

It is assumed that the controlled technical system (e.g. the robot 100) has an initial state $x_{t_0}=[x_0,\dot{x}_0]$ and a stabilizing control sequence, i.e. an initial control sequence which allows stable control of the controlled system is known $\overline{U}=[\overline{u}_0, \ldots, \overline{u}_{T-1}]$.

By rolling out the trajectory with dynamics $f(\cdot)$ as described above a nominal state sequence $\overline{X}=[\overline{x}_{t_0}, \ldots, \overline{x}_{t_T}]$ is obtained. The differential states and controls along the nominal trajectory $\{\overline{U},\overline{X}\}$ are defined as $$\overline{v}_t = [\overline{x}_t, \dot{\overline{x}}_t] \tag{7}$$

$$\delta v_t = [\mathrm{Log}_{\overline{x}_t}(x_t), \Gamma_{x_t \to \overline{x}_t}(\dot{x}_t) - \dot{\overline{x}}_t] = v_t \ldots \overline{v}_t \in \mathcal{T}_{\overline{x}_t}\mathcal{M}$$

$$\delta u_t = u_t - \overline{u}_t \in \mathcal{T}_{\overline{x}_t}\mathcal{M},$$

where for simplicity the notation of $v_t$ is slightly abused to now corresponds to the full state in tangent space, including position and velocity. The dynamics equation with the differential states and after dynamics linearization in $\mathcal{T}_{\overline{x}_t}$ becomes $$\overline{v}_{t+1} + \delta v_{t+1} = f(\overline{v}_t + \delta v_t, \overline{u}_t + \delta u_t) \tag{8}$$

$$= f(\overline{v}_t, \overline{u}_t) + A_{\overline{x}_t}\delta v_t + B_{\overline{x}_t}\delta u_t,$$

$$A_{\overline{x}_t} = \frac{\partial f(\overline{v}_t, \overline{u}_t)}{\partial v}$$

$$B_{\overline{x}_t} = \frac{\partial f(\overline{v}_t, \overline{u}_t)}{\partial u}$$

and consequently $$\delta v_{t+1} = A_{\overline{x}_t}\delta v_t + B_{\overline{x}_t}\delta u_t. \tag{9}$$

$A_{\overline{x}_t}$ and $B_{\overline{x}_t}$ may be seen as state approximation parameters (or, since they are actually whole matrices of parameters, may be seen to contain state approximation parameters if each component is seen as a parameter itself) for the state $\overline{x}_t$. Here, $B_{\overline{x}_t}$ is a state approximation parameter for approximating the dependency of a change $\delta v_{t+1}$ of state (from one time to the next) of the technical system from the control information $u_t$ in the tangent space at $\overline{x}_t$.

A linear-quadratic approximation of the cost function at every time step in the tangent space $\mathcal{T}_{\overline{x}_t}$ is used as follows $$l_t(\delta v_t, \delta u_t) = \hat{q}_t + \delta v_t^T q_t + \delta u_t^T r_t + \frac{1}{2}\delta v_t^T Q_t \delta v_t + \frac{1}{2}\delta u_t^T R_t \delta u_t + \delta u_t^T P_t \delta v_t \tag{10}$$

with $$\hat{q}_t = l_t(\overline{x}_t, \overline{u}_t), q_t = \frac{\partial l_t(\overline{x}_t, \overline{u}_t)}{\partial v}, Q_t = \frac{\partial l_t(\overline{x}_t, \overline{u}_t)}{\partial v^2}, \tag{11}$$

$$P_t = \frac{\partial^2 l_t(\overline{x}_t, \overline{u}_t)}{\partial v \partial u}, r_t = \frac{\partial^2 l_t(\overline{x}_t, \overline{u}_t)}{\partial u}, R_t = \frac{\partial^2 l_t(\overline{x}_t, \overline{u}_t)}{\partial u^2}.$$

The parameters of (11) may be seen as cost approximation parameters for the state $\overline{x}_t$ (again, each matrix and vector component may be seen as a cost approximation parameter). These include in particular cost approximation parameters for approximating the dependency of a change $l_t(\delta v_t, \delta o_t)$ of control cost of the state from the control information $u_t$ in the tangent space at $\overline{x}_t$.

It should be noted that here the cost function $l_t$ is (again with a slight abuse of notation) applied to the delta values to mean the change of the cost function when $v_t$ and $u_t$ change according to the delta values. A similar notation is used in the following for the value function.

Here it is assumed that the loss function approximation $l_t(\cdot)$ can be computed with tangent space vectors. It should be noted that the constant component $q_t$ equals the cost along the nominal trajectory. A linear-quadratic form for the value function $$V_t(\delta v_t) = \hat{s}_t + \delta v_t^T s_t + \delta v_t^T S_t \delta v_t.$$

is assumed with variables $\hat{s}_t, s_t, S_t$. These include in particular value approximation parameters for approximating the dependency of a change $V_t(\delta v_t)$ of value of the state from the control information $u_t$ in the tangent space at $\overline{x}_t$.

Using the Bellmann equation for finite-horizon problems the value function can be expanded, such that $$V_t(\delta v_t) = l_t(\delta v_t, \delta u_t) + V_{t+1}(\delta v_{t+1}) \tag{12}$$

$$= \hat{q}_t + \delta v_t^T q_t + \delta u_t^T r_t + \frac{1}{2}\delta v_t^T Q_t \delta v_t +$$

$$\frac{1}{2}\delta u_t^T R_t \delta u_t + \delta u_t^T P_t \delta v_t +$$

$$\hat{s}_{t+1} + \delta v_{t+1}^T s_{t+1}^\| + \delta v_{t+1}^T S_{t+1}^\| \delta v_{t+1},$$

where $$s_{t+1}^\| = \Gamma_{\overline{x}_{t+1} \to \overline{x}_t}(s_{t+1}), S_t^\| = \Gamma_{\overline{x}_{t+1} \to \overline{x}_t}(S_{t+1})$$

are the transported value function approximation components, as $s_{t+1}, S_{t+1} \in \mathcal{T}_{\overline{x}_{t+1}}$. Using the linear model approximation $\delta v_{t+1}=A_{\overline{x}_t}\delta v_t+B_{\overline{x}_t}\delta u_t$ the value function can be simplified to $$V_t(\delta v_t) = \hat{q}_t + \hat{s}_{t+1} + \delta v_t^T (q_t + A_{\overline{x}_t}^T s_{t+1}^\|) + \frac{1}{2}\delta v_t^T (Q_t + A_{\overline{x}_t}^T S_{t+1}^\| A_{\overline{x}_t})\delta v_t + \tag{13}$$

$$\delta u_t^T (r_t + B_{\overline{x}_t}^T s_{t+1}^\| + P_t + B_{\overline{x}_t}^T S_{t+1}^\| A_{\overline{x}_t}) + \frac{1}{2}\delta u_t^T (R_t + B_{\overline{x}_t}^T S_{t+1}^\| B_{\overline{x}_t})\delta u_t.$$

As the gradient of the optimal value function with respect to the control difference $\delta u_t$ has to be 0, a closed form solution for the control update can be obtained as $$g_t = r_t + B_{\overline{x}_t}^T s_{t+1}^\|, \tag{14}$$

$$G_t = P_t B_{\overline{x}_t}^T S_{t+1}^\| A_{\overline{x}_t},$$

$$H_t = R_t B_{\overline{x}_t}^T S_{t+1}^\| B_{\overline{x}_t},$$

$$\delta u_t = -H_t^{-1} g_t - H_t^{-1} G_t \delta v_t$$

$$= \delta u_t^{\mathit{ff}} - K_t \delta v_t,$$

which shows that the optimal control update has a feedforward $\delta u_t^{\mathit{ff}}=-H_t^{-1}g_t$ and a feedback components with gain $K_t=H_t^{-1}G_t$. Substituting the optimal control update $\delta u_t$ into equation (9) and by the definition of the quadratic value function approximation $V_t(\delta v_t) = \hat{s}_t + \delta v_t^T s_t + \delta v_t^T S_t \delta v_t$ the recursive equations $$S_t = Q_t + A_{\bar{x}_t}^T S_{t+1}^{\parallel} A_{\bar{x}_t} + K_t^T H_t K_t + K_t G_t + G_t^T K_t, \qquad (15)$$

$$s_t = q_t + A_{\bar{x}_t}^T S_{t+1}^{\parallel} + K_t^T H_t u_t^{ff} + K_t^T g_t + G_t^T \delta u_t^{ff},$$

$$\hat{s}_t = \hat{q}_t + s_{t+1} + \frac{1}{2} \delta u_t^{ff^T} H_t \delta u_t^{ff} + \delta u_t^{ff^T} g_t,$$

can be obtained, which are initialized with $S_T = Q_T, s_T = q_T, \hat{s}_T = \hat{q}_T.$ According to the above, according to various embodiments, Riemannian iterative linear quadratic control (iLQC) is performed as follows:
 Rollout the trajectory along the nominal control trajectory (i.e. determine the initial sequence of states which the controlled system takes when being controlled by the initial control sequence)
 Approximate the system dynamics (Equation (8)) and cost (equation (10)) along the nominal trajectory $\{\bar{X}, \bar{U}\}$
 Compute the backward pass (Equations (15))
 Update the feedforward control and the feedback gains in a forward pass (equations (14))

In the following, an example algorithm (e.g. corresponding to the optimal control algorithm 112) for the Riemannian iLQC is given.

As then the new nominal state $r_t^{[k+1]}$ is known, the computed control is transported to this state before further rolling out the dynamics.

As the iLQC relies on local linear-quadratic approximation of the optimal control problem, an initial nominal trajectory needs to be provided. This is achieved by forward integrating, or single shooting the initial stabilizing control sequence. Often this control sequence is difficult to obtain, especially in the case of nonlinear dynamics. In practice a proportional-derivate controller (PD) can be applied, which is straightforward to implement for Riemannian manifolds. However, the trajectory generated by a PD controller might be far from optimal with respect to the cost $l_t(\cdot)$.

A disadvantage of single shooting is the accumulation of model approximation errors along the updated trajectory, which might even lead to unstable trajectories. In the following, a Riemannian extension to Gauss-Newton Multiple Shooting is described which addresses this issue and which leads to more stable behaviours.

As mentioned, for nonlinear dynamics systems finding an initial stabilizing control sequence is often nontrivial. With a poor initialization iLQC may not converge to a stable solution. Notice that with iLQC only the control sequence U is optimized and the dynamics are forward integrated to obtain the state trajectory X from $x_{t_0}$. While this is dynamically consistent, the local linear-quadratic approximation may be inaccurate along the trajectory with larger control changes, which ultimately contributes to slow or failed convergence.

```
 1 Initial state x̄ = [x̄₀, x̄₀]
 2 Stabilizing control trajectory U = [ū₀, . . . , ū_{T−1}]
 3 Convergence criteria ΔJ_lim
 4 Dynamics f(·) and trajectory cost function l_t(·), ∀t
 5 Set iteration counter k = 0
 6 while |J_k − J_{k−1}| ≥ ΔJ_lim do
 7  |  Rollout trajectory with {x̄0, U^[k]} and obtain
    |   X^[k] = x̄₀ , . . . , x̄_T].
 8  |  Linearize the dynamics to obtain { A_{x̄_t}^[k], B_{x̄_t}^[k] }_{t=0}^{T−1}
 9  |  Quadratize the cost to obtain {q̂_t, q_t, Q_t, P_t, r_t, R_t}_{t=0}^T
10  |  Perform backward pass to obtain {ŝ_t, s_t, S_t}_{t=0}^T and
11  |  Set initial state for the new iteration x̄₀^[k+1] = x̄₀
12  |  for t=0, . . . , T−1 do
13  |   |  x_t^[k] ← x̄_t, ẋ_t^[k] ← x̄_t, u_t^[k] ← ū_t
14  |   |  Compute control update in T_{x̄_t}^[k] M:
    |   |   u_t^[k+1] = u_t^[k] + δu_t^ff − K_t [Log_{x_{t}^[k]}(x_t^[k+1]), Γ_{x_t^[k+1] → x_t^[k]}(ẋ_t^[k+1]) − ẋ_t^[k]]
15  |   |  Tansport control to T_{x_t^[k+1]} M,
    |   |   u_t^[k+1] ← Γ_{x_t^[k] → x_t^[k+1]}(u_t^[k+1])
16  |   |  Rollout dynamics with {x_t^[k+1], u_t^[k+1]} to obtain x_{t+1}^[k+1]
17  |  end
18  |  Compute total cost along new nominal trajectory
    |   J_{k+1} = J(X^[k+1], U^[k+1])
19  |  k++
20 end
```

It should be noted that in the Euclidean case with a quadratic cost and a linear dynamics, the algorithm given above converges in one iteration. However, as manifold operations are not generally linear, in the Riemannian case even with quadratic costs and linear tangent space dynamics it may take multiple iterations till convergence.

Further, it should be noted that the computation of the backward-forward pass (i.e. backward pass followed by the forward pass) takes place along the nominal trajectory, that is, along $\bar{x}_t, \bar{u}_t \in \mathcal{T}_{\bar{x}_t}$. Consequently, the feedforward control $\delta u_t^{ff}$ and feedback gains $K_t$ are also defined in the tangent space of the nominal state. Therefore, first the updated control $u_t^{[k+1]}$ in the tangent space of $x_t^{[k]} \triangleq \bar{x}_t$ is computed.

Therefore, according to various embodiments, not only the controls are optimized but also the states as additional decision variables. This approach breaks the whole state-control trajectory into smaller pieces (even as small as one time step length) and provides a solution for the short trajectory segments. Instead of single shooting with the full control sequence from the initial state, as with iLQC, this is then multiple shooting of smaller trajectory segments (also denoted as Gauss-Newton Multiple Shooting).

While the number of optimization variables increases, solving the local control problems is significantly more stable, as state changes are not integrated over the whole trajectory, but in the local segments only. The stitching of trajectory segments, that is, the satisfaction of dynamics constraints, is iteratively achieved in a forward-backward computation pass.

For the Gauss-Newton multiple shooting, the difference between the decision variable and the dynamics rollout is defined as the defect $d_t$ as $$d_t = f(x_t, \dot{x}_t, u_t) - [\text{Log}_{x_t}(x_{t+1}), \Gamma_{x_{t+1} \to x_t}(\dot{x}_{t+1}) - \dot{x}_t], \tag{16}$$

with $d_t \in \mathcal{T}_{\mathbf{x}_t}$. In equation (16) every state $x_t = [x_t, \dot{x}_t]$ and control $u_t$ is a decision variable.

Figure 4:
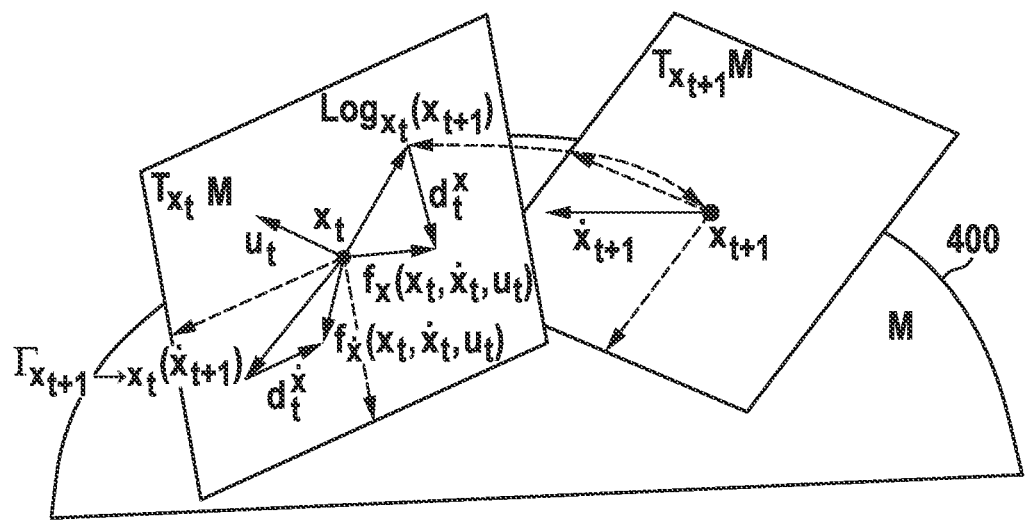
FIG. 4 illustrates the definition of a defect on a Riemannian manifold for Gauss Newton multiple shooting according to an example embodiment of the present invention.

FIG. 4 illustrates the definition of the defect on a Riemannian manifold 400.

Using system dynamics linearization along the state sequence the local dynamics model with the defect and differential states $\delta v$, $\delta u$ can be written as $$v_{t+1} + \delta v_{t+1} = f(v_t + \delta v_t, u_t + \delta u_t), \tag{17}$$

$$\delta v_{t+1} = A_{x_t} \delta v_t + B_{x_t} \delta u_t + d_t.$$

The iLQC approach is applied to arrive at exactly the same local quadratic approximation of the cost function as above (equation (10)) . The local quadratic definition of the value function will however, as opposed to iLQC, include the defect according to $$V_t(\delta v_t) = l_t(\delta v_t, \delta u_t) + V_{t+1}(A_{x_t} \delta v_t + B_{x_t} \delta u_t + d_t). \tag{18}$$

The optimal solution for the differential control $\delta u_t$ only differs from the iLQC solution in the computation of the feedforward term $$g_t = r_t + B_{x_t}^T \left( s_{t+1}^{\|} + S_{t+1}^{\|} d_t \right), \tag{19}$$

$$\delta u_t^{ff} = -H_t^{-1} g_t,$$

$$\delta u_t = \delta u_t^{ff} - K_t \delta v_t,$$

while the of the computations for $H_t$ and $G_t$ are the same as in equations (14). The recursive equations for Gauss-Newton multiple shooting are given by $$S_t = Q_t + A_{x_t}^T S_{t+1}^{\|} A_{x_t} - K_t^T H_t K_t, \tag{20}$$

$$s_t = q_t + A_{x_t}^T \left( s_{t+1}^{\|} + S_{t+1}^{\|} d_t \right) + G_t^T u_t^{ff} + K_t^T \left( g_t + H_t u_t^{ff} \right),$$

$$s_t = \hat{q}_t + s_{t+1} + d_t^T s_{t+1}^{\|} + \frac{1}{2} d_t^T S_{t+1}^{\|} d_t + u_t^{ff^T} \left( g_t + \frac{1}{2} H_t u_t^{ff} \right).$$

with initializations $S_T = Q_T$, $s_T = q_T$, $s_T = \hat{q}_T$. After computing recursively the feedforward controls and the feedback gains, the decision variables need to be updated. Similarly as in the single shooting iLQC described above the nominal control is for Gauss-Newton multiple shooting updated as $$u_t^{[k+1]} = u_t^{[k]} + \delta u_t^{ff} - K_t \left[ \text{Log}_{x_t^{[k]}}(x_t^{[k+1]}), \Gamma_{x_t^{[k+1]} \to x_t^{[k]}}(\dot{x}_t^{[k+1]}) - \dot{x}_t^{[k]} \right]. \tag{21}$$

However, the nominal state trajectory is not obtained by forward integration, but by the following update equation $$[\delta v_{t+1}, \delta \dot{x}_{t+1}] = \left( A_{x_t^{[k]}} + B_{x_t^{[k]}} K_t \right) \tag{22}$$

$$\left[ \text{Log}_{x_t^{[k]}}(x_t^{[k+1]}), \Gamma_{x_t^{[k+1]} \to x_t^{[k]}}(\dot{x}_t^{[k+1]}) - \dot{x}_t^{[k]} \right] + B_{x_t^{[k]}} g_t + d_t$$

$$v_{t+1} = \text{Log}_{x_t^{[k]}}(x_{t+1}^{[k]})$$

$$x_{t+1}^{[k+1]} = \text{Exp}_{x_t^{[k]}}(v_{t+1} + \delta v_{t+1})$$

$$\dot{x}_{t+1}^{[k+1]} = \Gamma_{x_{t+1}^{[k]} \to x_{t+1}^{[k+1]}} \left( \Gamma_{x_t^{[k]} \to x_t^{[k]}}(\dot{x}_{t+1}^{[k]}) + \delta \dot{x}_{t+1} \right)$$

It should be noted that the state updates (first two of the equations (22)) are computed in the tangent space of $x_t^{[k]}$, where the defect $d_t$ is also defined. Then, after the state update in (third of the equations (22)), the velocity is also transported from $x_t^{[k]}$ to the updated state $x_{t+1}^{[k+1]}$ (fourth of the equations (22)).

Figure 5:
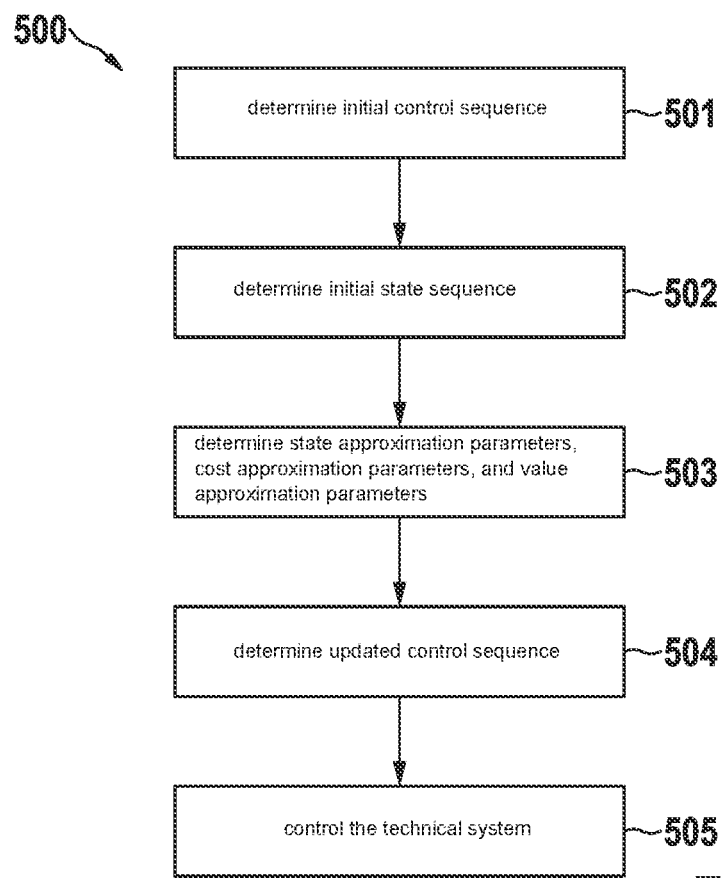
FIG. 5 shows a flow diagram illustrating a method for controlling a technical system according to an example embodiment of the present invention.

In summary, according to various embodiments, a method is provided as illustrated in FIG. 5.

FIG. 5 shows a flow diagram 500 illustrating a method for controlling a technical system according to an embodiment.

In 501, an initial control sequence comprising control information for each control time of a sequence of control times is determined.

In 502, an initial state sequence which the technical system follows when being controlled according to the initial control sequence is determined, wherein the initial state sequence comprises states wherein each state is given by an element of a predetermined Riemannian manifold.

In 503, for each state of the initial state sequence,
state approximation parameters for approximating the dependency of a change of state of the technical system from the control information in the tangent space of the Riemannian manifold at the state are determined;
cost approximation parameters for approximating the dependency of a change of control cost of the state from the control information in the tangent space of the Riemannian manifold at the state are determined; and
value approximation parameters for approximating the dependency of a change of value of the state from the control information in the tangent space of the Riemannian manifold at the state by following the initial state sequence backwards and updating the value approximation parameters from state to state according to the state approximation parameters and the cost approximation parameters are determined.

In 504, for each control time, an updated control sequence is determined comprising updated control information for each control time by following the sequence of control times forwards and determining the updated values by determining them to maximize such that the values of the states of the state sequence which the technical system follows when being controlled according to the updated control sequence are maximized according to the value approximation parameters.

This means that the updated values are determined to maximize the values of the states which the technical system follows when being controlled according to the updated control sequence assuming that the value approximation parameters (correctly) reflect the dependency of the values from the states. This may be done, as explained above, by setting the derivative of the values with respect to the control information to zero to get a condition for determining the updated control information such that the above condition (maximizing the values) is fulfilled.

In 505, the technical system is controlled according to the updated control sequence.

The approach of FIG. 5 can be used to compute a control signal for controlling a technical system, like e.g. a computer-controlled machine, like a robot (or robotic system), a vehicle, a domestic appliance, a power tool, a manufacturing machine, a personal assistant or an access control system.

It may in particular be applied to robotic manipulators (SE (3) manifold of robotic end-effectors), or mobile robots, humanoids, quadrupeds in joint space (torus manifold, product of hypersphere manifolds). The Riemannian manifold may for example be (or include) the $S^3$ manifold which is the space where quaternions live, which are often used in robotics to represent orientation in 3D space. There is a direct conversion between $S^3$ and SO (3), but SO(3) is a bit more difficult to work with. Another option is the space of positive semi-definite matrices, e.g. convariances (or any square matrix with non-negative, real eigenvalues). This SPD manifold (which looks like a cone in embedding space) may be used to define force/velocity manipulatiblity. It should be noted that the state space may in various embodiments also be be a combination of Riemannian manifolds (e.g. a combination of a Euclidean space and orientation in a non-Euclidean manifold). Those may in that case together be considered as one Riemannian manifold whose elements give (i.e. represent) the states.

Various embodiments may receive and use sensor data from various visual sensors (cameras) such as video, radar, LiDAR, ultrasonic, thermal imaging, motion, sonar etc., for example to determine the technical system's state that is reached with a certain control. For example measure and control may be performed, i.e. data (e.g. scalar time series, in particular sensor data) may be analyzed and then the technical system may be operated accordingly.

According to one embodiment, the method is computer-implemented.

Although specific embodiments of the present invention have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method for controlling a technical system, comprising the following steps:
   determining an initial control sequence including control information for each control time of a sequence of control times;
   determining an initial state sequence which the technical system follows when being controlled according to the initial control sequence, wherein the initial state sequence includes states wherein each state of the states is given by an element of a predetermined Riemannian manifold;
   determining, for each state of the initial state sequence,
      state approximation parameters for approximating a dependency of a change of state of the technical system from control information in a tangent space of the Riemannian manifold at the state,
      cost approximation parameters for approximating a dependency of a change of control cost of the state from the control information in the tangent space of the Riemannian manifold at the state;
      value approximation parameters for approximating a dependency of a change of value of the state from the control information in the tangent space of the Riemannian manifold at the state by following the initial state sequence backwards and updating the value approximation parameters from state to state according to the state approximation parameters and the cost approximation parameters;
   determining, for each control time, an updated control sequence including updated control information for each control time by following the sequence of control times forwards and determining updated values by determining them to maximize such that values of the states of the state sequence which the technical system follows when being controlled according to the updated control sequence are maximized according to the value approximation parameters; and
   controlling the technical system according to the updated control sequence.

2. The method of claim 1, further comprising separating the sequence of control times into a plurality of segments and treating a starting state of each segment as a decision variable when determining the updated control sequence.

3. The method of claim 1, wherein the state approximation parameters linearly approximate the dependency of a change of state of the technical system from the control information in the tangent space of the Riemannian manifold at the state.

4. The method of claim 1, wherein the cost approximation parameters quadratically approximate the dependency of a change of control cost of the state from the control information in the tangent space of the Riemannian manifold at the state.

5. The method of claim 1, wherein the value approximation parameters quadratically approximate the dependency of a change of value of the state from the control information in the tangent space of the Riemannian manifold at the state.

6. The method of claim 1, further comprising:
   performing multiple iterations including, in each iteration from a first iteration to a last iteration:
      determining a respective initial control sequence including control information for each control time of the sequence of control times;
      determining a respective initial state sequence which the technical system follows when being controlled according to the initial control sequence, wherein the initial state sequence includes states wherein each state is given by an element of the predetermined Riemannian manifold;
      determining, for each state of the respective initial state sequence:
         state approximation parameters for approximating the dependency of a change of state of the technical system from the control information in the tangent space of the Riemannian manifold at the state,
         cost approximation parameters for approximating the dependency of a change of control cost of the state from the control information in the tangent space of the Riemannian manifold at the state,
         value approximation parameters for approximating the dependency of a change of value of the state from the control information in the tangent space of the Riemannian manifold at the state by following the initial state sequence backwards and updating the value approximation parameters from state to state according to the state approximation parameters and the cost approximation parameters;
      determining, for each control time, an updated control sequence including updated control information for each control time by following the sequence of control times forwards and determining the updated values such that the values of the states of the state sequence which the technical system follows when being controlled according to the updated control sequence are maximized according to the value approximation parameters;

wherein, for each iteration except the last iteration, the updated control sequence of the iteration is the initial control sequence for the next iteration and wherein the method further comprises controlling the technical system according to the updated control sequence.

7. A controller configured to control a technical system, the controller configured to:

determine an initial control sequence including control information for each control time of a sequence of control times;

determine an initial state sequence which the technical system follows when being controlled according to the initial control sequence, wherein the initial state sequence includes states wherein each state of the states is given by an element of a predetermined Riemannian manifold;

determine, for each state of the initial state sequence,
state approximation parameters for approximating a dependency of a change of state of the technical system from control information in a tangent space of the Riemannian manifold at the state,
cost approximation parameters for approximating a dependency of a change of control cost of the state from the control information in the tangent space of the Riemannian manifold at the state;
value approximation parameters for approximating a dependency of a change of value of the state from the control information in the tangent space of the Riemannian manifold at the state by following the initial state sequence backwards and updating the value approximation parameters from state to state according to the state approximation parameters and the cost approximation parameters;

determine, for each control time, an updated control sequence including updated control information for each control time by following the sequence of control times forwards and determining updated values by determining them to maximize such that values of the states of the state sequence which the technical system follows when being controlled according to the updated control sequence are maximized according to the value approximation parameters; and control the technical system according to the updated control sequence.

8. A non-transitory computer-readable medium on which is stored a computer program including instructions for controlling a technical system, the instructions, when executed by a computer, causing the computer to perform the following steps:

determining an initial control sequence including control information for each control time of a sequence of control times;

determining an initial state sequence which the technical system follows when being controlled according to the initial control sequence, wherein the initial state sequence includes states wherein each state of the states is given by an element of a predetermined Riemannian manifold;

determining, for each state of the initial state sequence,
state approximation parameters for approximating a dependency of a change of state of the technical system from control information in a tangent space of the Riemannian manifold at the state,
cost approximation parameters for approximating a dependency of a change of control cost of the state from the control information in the tangent space of the Riemannian manifold at the state;
value approximation parameters for approximating a dependency of a change of value of the state from the control information in the tangent space of the Riemannian manifold at the state by following the initial state sequence backwards and updating the value approximation parameters from state to state according to the state approximation parameters and the cost approximation parameters;

determining, for each control time, an updated control sequence including updated control information for each control time by following the sequence of control times forwards and determining updated values by determining them to maximize such that values of the states of the state sequence which the technical system follows when being controlled according to the updated control sequence are maximized according to the value approximation parameters; and controlling the technical system according to the updated control sequence.

* * * * *